(12) United States Patent
Andersson et al.

(10) Patent No.: US 9,964,394 B2
(45) Date of Patent: May 8, 2018

(54) ALIGNMENT APPARATUS AND METHOD

(71) Applicant: AKTIEBOLAGET SKF

(72) Inventors: Nils Olof Torbjörn Andersson, Kungsbacka (SE); Thomas Eivind Andersson, Lindome (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 14/738,727

(22) Filed: Jun. 12, 2015

(65) Prior Publication Data

US 2016/0363432 A1 Dec. 15, 2016

(51) Int. Cl.
*G01B 5/25* (2006.01)
*G01B 11/27* (2006.01)
*G01B 7/31* (2006.01)

(52) U.S. Cl.
CPC ............. *G01B 5/25* (2013.01); *G01B 7/31* (2013.01); *G01B 11/27* (2013.01)

(58) Field of Classification Search
USPC ............................ 33/412, 529; 356/153, 399
See application file for complete search history.

(56) References Cited

U.S. PATENT DOCUMENTS

| | | | | |
|---|---|---|---|---|
| 2,634,939 A * | 4/1953 | Voss | ................ | G01B 5/25 248/229.17 |
| 3,783,522 A * | 1/1974 | Dodd | ................ | G01B 7/31 33/661 |
| 4,161,068 A * | 7/1979 | McMaster | ................ | G01B 11/27 33/412 |
| 4,516,328 A * | 5/1985 | Massey | ................ | G01B 5/25 33/412 |
| 4,578,869 A * | 4/1986 | O'Brien | ................ | G01B 5/25 33/533 |
| 4,943,771 A * | 7/1990 | Fuschetto | ................ | G01B 7/31 324/207.18 |
| 4,964,224 A * | 10/1990 | Jackson | ................ | G01B 5/25 33/412 |
| 5,056,237 A * | 10/1991 | Saunders | ................ | G01B 5/25 33/1 PT |
| 5,684,578 A * | 11/1997 | Nower | ................ | G01B 11/272 33/286 |
| 5,980,094 A * | 11/1999 | Nower | ................ | G01B 21/24 33/412 |
| 6,411,375 B1 * | 6/2002 | Hinkle | ................ | G01B 11/272 33/286 |
| 7,301,616 B2 * | 11/2007 | Foley | ................ | G01B 11/272 356/141.3 |
| 9,080,862 B2 * | 7/2015 | Weihrauch | ................ | G01B 11/272 |

* cited by examiner

*Primary Examiner* — Christopher Fulton
(74) *Attorney, Agent, or Firm* — Mark Ussai; SKF USA Inc. Patent Dept.

(57) ABSTRACT

An alignment apparatus (the tool) of the present invention includes a pair of bracket devices for rigidly holding shafts. As the shafts are secured to the bracket devices with chains, sensors of one of the bracket devices are exposed to an extension beam of the other bracket device thereby defining gaps or distances between the extension beam and the sensors. If offset is determined between the distances because one shaft is misaligned relative the other shaft, the sensors send signal to a mobile device, thereby informing a user about misalignment between the shafts.

18 Claims, 5 Drawing Sheets

ALIGNMENT APPARATUS AND METHOD

FIELD OF THE INVENTION

The present invention relates generally to apparatus and method for aligning shafts and other parts which are coupled together, and more particularly to the apparatus and method to determine misalignment between the shafts in order to properly align the shafts.

BACKGROUND OF THE INVENTION

As known to those skilled in the art, it is very important that the shafts be aligned within predetermined tolerances when two rotating machine shafts are coupled together, such as, for example, the shaft of an electric motor and the shaft of a pump. Shaft alignment is recommended for almost every industry, as it enables machine uptime to be significantly improved and maintenance costs to be reduced. Correct shaft alignment is very important for the machines, as misalignment causes vibration and additional forces that damage the machine components such as, bearings, seals, couplings and foundation bolts.

When perfectly aligned, such shafts have their axes of rotation thereby coinciding along a straight line. Contrary, any misalignment, even minimal, can lead to vibration, excessive wear, and ultimate destruction of couplings, bearings, seals, gears and other components. Even flexible couplings that are designed to withstand minor misalignments cannot prevent negative effects on other machine components. Field experience shows that around 50% of machine breakdowns can be attributed to damage resulting from shaft misalignment.

Today, three alignment methods are commonly used. Straight edges or Eyesight, which are fast and easy methods but not accurate. Dial gauges which allow high accuracy but are complicated to use. Laser alignment systems which are very accurate and easy to use but require a higher investment. In addition, alignment brackets have been employed for many years in order to measure particular relative offset as the shafts typically are rotated together through one revolution, taking readings at various angular positions. Each relative displacement is measured between a point referenced to one of the shafts by means of the alignment bracket and a point on the other shaft.

Alluding to the above, one of the prior art references teaches an apparatus for aligning rotatable in-line machine shafts. The apparatus includes a sensed point positioned for rotation with the shaft to be aligned to provide a reference point against which misalignment is measured. The position of the sensed point is adjustable in three-dimensional space by an adjustment system so that the sensed point may be easily secured in a desired location to eliminate errors attributable to movement of the sensed point or improper location of the sensed point.

Another prior art reference teaches an alignment apparatus system for aligning coupled shafts, for example between a motor and a driven device, which comprises an alignment fixture, alone and in combination with one or more of an adjustable fixture post or a sag remover. The alignment fixture comprises an extendable radial arm and a laterally extending arm, which is axial to shaft being aligned, on which a dial indicator is mounted distal to the radial arm. The alignment fixture is mounted to one shaft and the dial indicator contacts the other shaft or a rigid coupling hub mounted thereon and the misalignment is determined and corrected in the usual manner. In some instances, the dial indicator cannot contact the second shaft and the fixture post which extends radially from the second shaft provides the contact point for the dial indicator.

Still another prior art reference teaches a machine shaft aligning apparatus that includes electronic indicating devices for automatically outputting signals to a computer indicative of the magnitude and direction of radial displacement of two coupled shafts as the coupled shafts are rotated to 4 clock positions (i.e. 12, 3, 6, and 9 o'clock). The computer enables calculation and display of horizontal and vertical machine adjustments required to effect proper coaxial alignment of the coupled shafts of the machines.

To the extent effective, the aforementioned prior art devices are complicated to use, bulky, and expensive to manufacture and service. Thus, an opportunity exists for unique measurement device and method that will allow verification of accuracy and repeatability of the measurements in minutes thereby welcoming simple user experience and reducing calibration time.

Still another opportunity exists for a system that will perform in terms of accuracy and repeatability to an acceptable level replacing all other expensive and complicated devices known in the art and will combine all of these benefits of Straight edges or Eyesight alignments, dial gauges, and laser alignment systems thereby offering the system, which is very easy to use, fast, and affordable for every budget.

This invention, together with the additional features and advantages thereof, which is only summarized in the foregoing passages, will become more apparent to those of skill in the art upon reading the description of the preferred embodiments, which follows in the specification taken together with the drawings.

SUMMARY OF THE INVENTION

An alignment apparatus (the tool) of the present invention includes a pair of bracket devices for rigid mounting to shafts interconnected by a coupling, with one of the shafts extending from a first machine such as a motor and the other from a second machine such as a compressor. Each bracket device includes a V-shaped element having a top side and terminals ends defined by sides spaced from one another to form gaps. The sides include ear portions with openings formed therein to receive a barrel used as pivoting point. The barrel defines an inlet used to receive a pin connected to and extending from a chain thereby allowing the chain and the pin to pivot about the ear portions as the shafts are rigidly secured within the brackets devices.

The bracket device includes a pair of rods extending outwardly from the top side and a bar bracket for holding a magnet. The bar bracket includes side towers to receive the rods to allow the bar bracket to move between different position and relative to the bracket device about the rods. The bar bracket defines a center part presenting a central opening and several inlets. An extension beam slides and rests on the center part of the bar bracket.

Similar to the first bracket device, the second bracket device also includes the rods extending outwardly from the top side, a unit bracket holder for holding a housing unit. The unit bracket holder includes a battery to provide power and an electrical circuit board and a controller or central processing unit. A lid part is used to protect the battery and the electrical circuit board from any possible external impact and contaminants such as water, dust, and the like. A pair of sensor holders extend from the bottom portion of the enclosure part to receive sensors or sensor probes disposed therein and exposed to the extension beam. The sensors for measuring the gap are non-contact sensors, preferably induction sensors.

The tool moves between multiple angular positions, e.g. 12 o'clock, 3 o'clock, 6 o'clock, and 9 o'clock positions. The tool is cooperably connected to a mobile device, such as, for example, IPhone, wherein the mobile device indicated on its screen the angular positions of the tool. As shafts are secured with the chains, the sensors or sensor probes are exposed to the extension beam thereby defining gaps or distances between the extension beam and the sensor probes.

A difference between the two measurements is indicative of misalignment. In order to calculate the nature of the misalignment, a reading is taken at a reference angular position e.g. 3 o'clock. This reading consists of the two distances measured by the sensors. The reading is set to zero at the reference position. The shafts and the tool are then rotated to at least two further angular positions, e.g. 12 o'clock and 9 o'clock, and the further readings are used to calculate the misalignment. This method is typically referred to as the double radial method and is well known in the art.

An advantage of the present invention is to provide an improved alignment system offering live view to help the user quickly achieve accurate positioning wherein a built in reporting function shows when the alignment has been achieved and to allow the results to be shared for reference keeping or for operator driven reliability programs.

Another advantage of the present invention is to provide an improved alignment system for basic and advanced shaft alignment, which allows accurate and fast machine alignment.

Still another advantage of the present invention is to provide an improved alignment system that will increase the reliability of machines prolonging the overall lifetime and reducing maintenance costs.

Still another advantage of the present invention is to provide an improved alignment system that will use mobile devices, which will intuitively guides the user through the whole alignment process.

Still another advantage of the present invention is to provide an improved alignment system with a focus on the core alignment tasks, designed to be a very easy-to-use instrument that results in accurate alignment and is especially suitable for entry level shaft alignment.

Still another advantage of the present invention is to provide an improved alignment system that uses inductive proximity sensors, enabling accurate and reliable shaft alignment to be affordable for every budget.

Still another advantage of the present invention is to provide an improved alignment system to allow high resolution graphics, intuitive usage, automatic software updates and display unit choice.

Still another advantage of the present invention is to provide an improved alignment system using inductive proximity sensors, whereby the measurement is no longer affected by bright sunlight, influence of backlash is reduced and the instrument becomes more robust.

Still another advantage of the present invention is to provide an improved alignment system enabling to deliver highly accurate and reliable alignment.

Still another advantage of the present invention is to provide an improved alignment system wherein automatic alignment reports give a complete overview of the alignment process and results.

Still another advantage of the present invention is to provide an improved alignment system that will easily compete with laser based shaft alignment systems.

Still another advantage of the present invention is to provide a system that performs in terms of accuracy and repeatability to an acceptable level in not better that dial gauge and all other expensive and complicated devices known in the art.

Other advantages and meritorious features of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
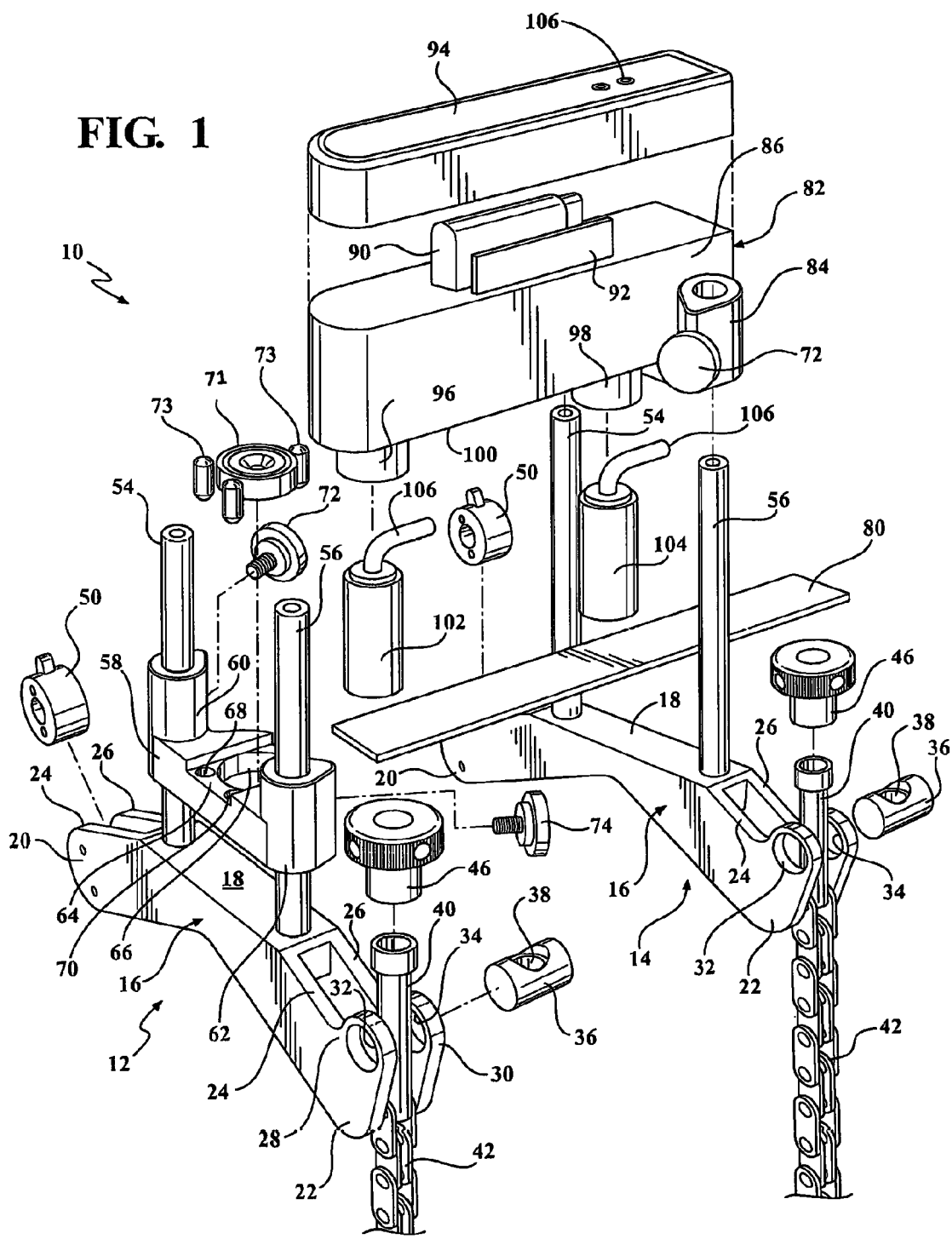
FIG. 1 illustrates an exploded view of an alignment apparatus of the present invention.
Figure 2:
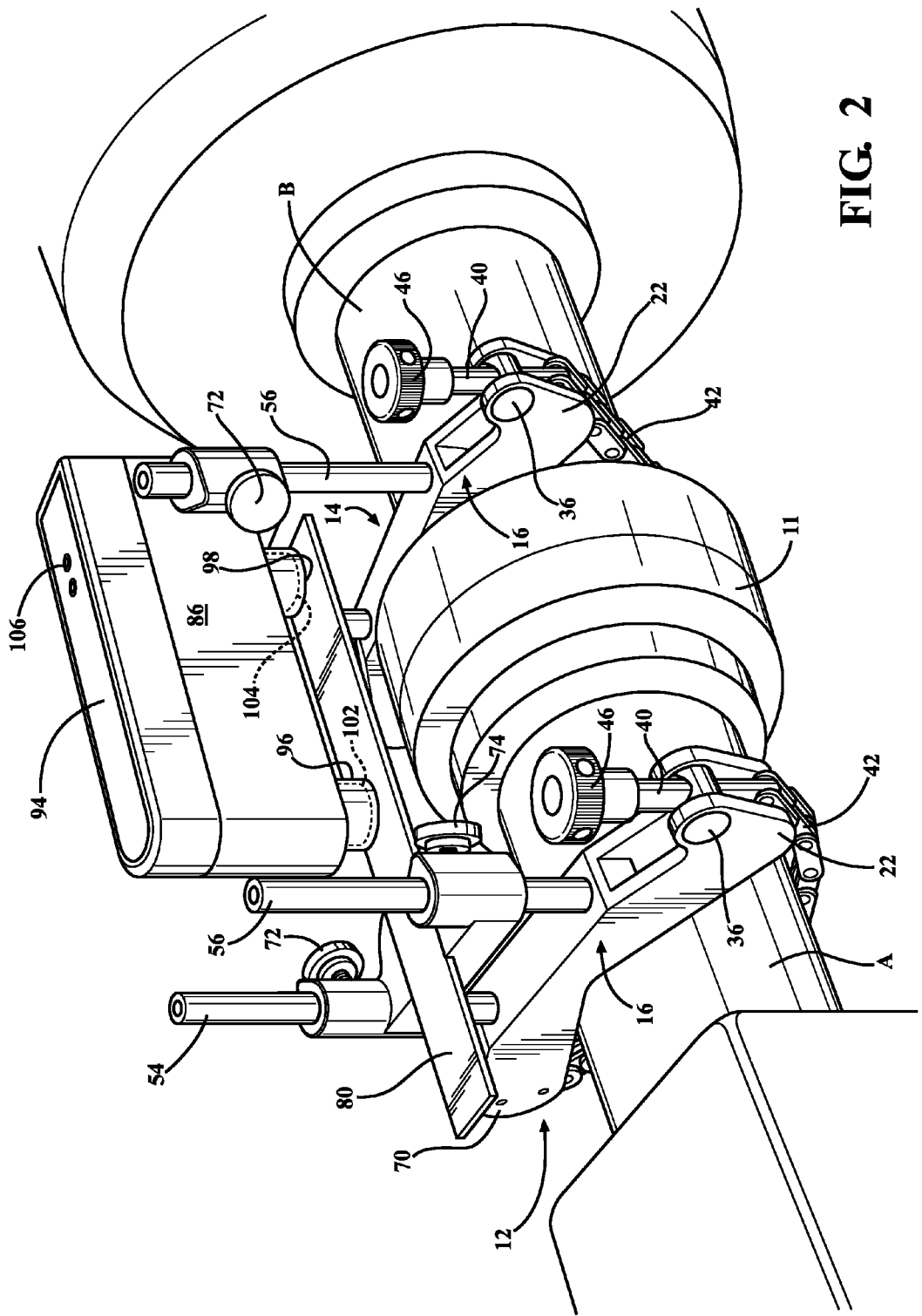
FIG. 2 illustrates a perspective view of the apparatus of FIG. 1, wherein the apparatus holds pair of shafts connected to a coupling with one of the shafts extending from a motor and the other from a compressor.
Figure 3:
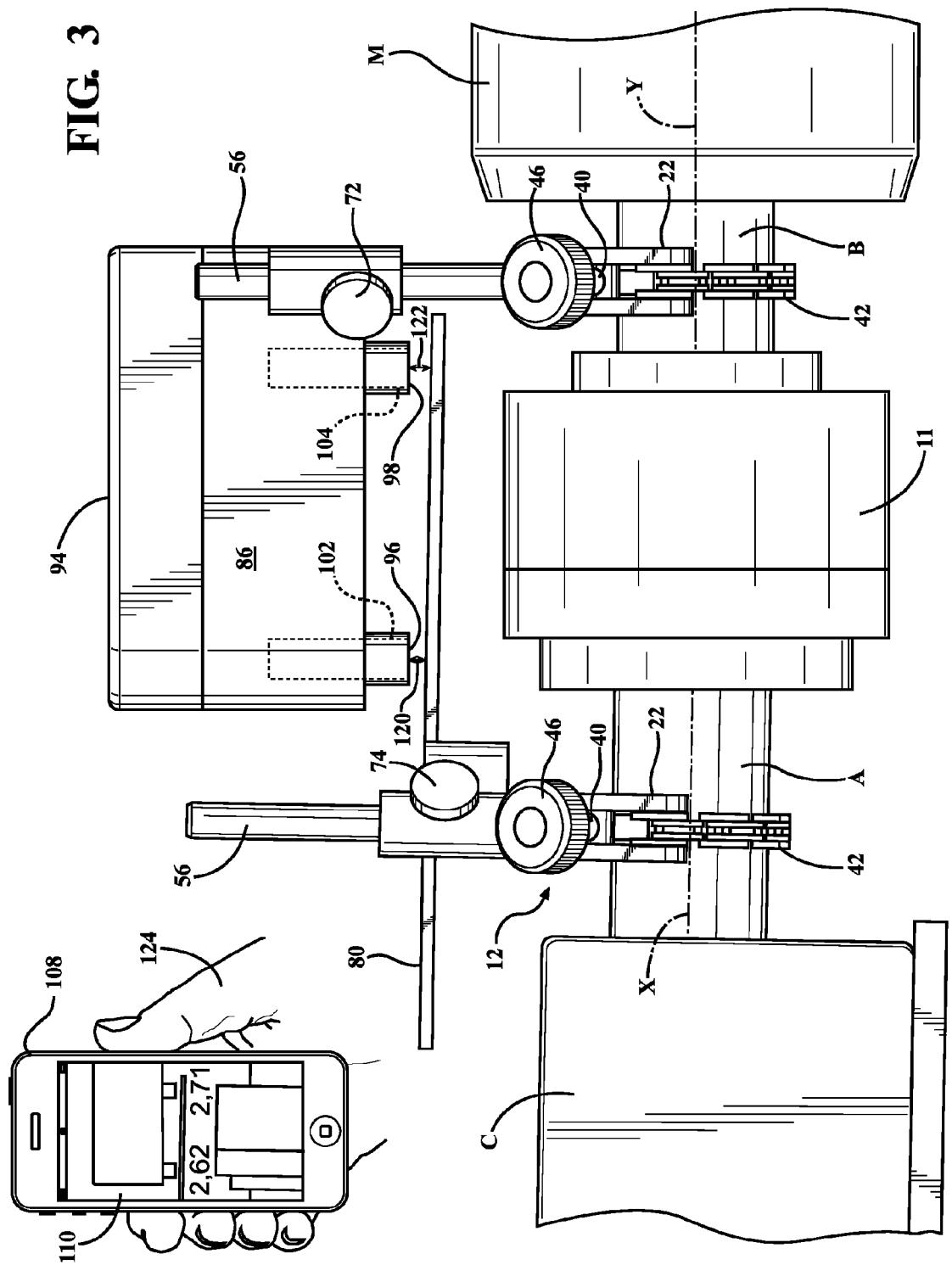
FIG. 3 illustrates a side view of the apparatus cooperably connected to a mobile device wherein the mobile device indicated on its screen that one of the shafts is misaligned with the other shaft.
Figure 4:
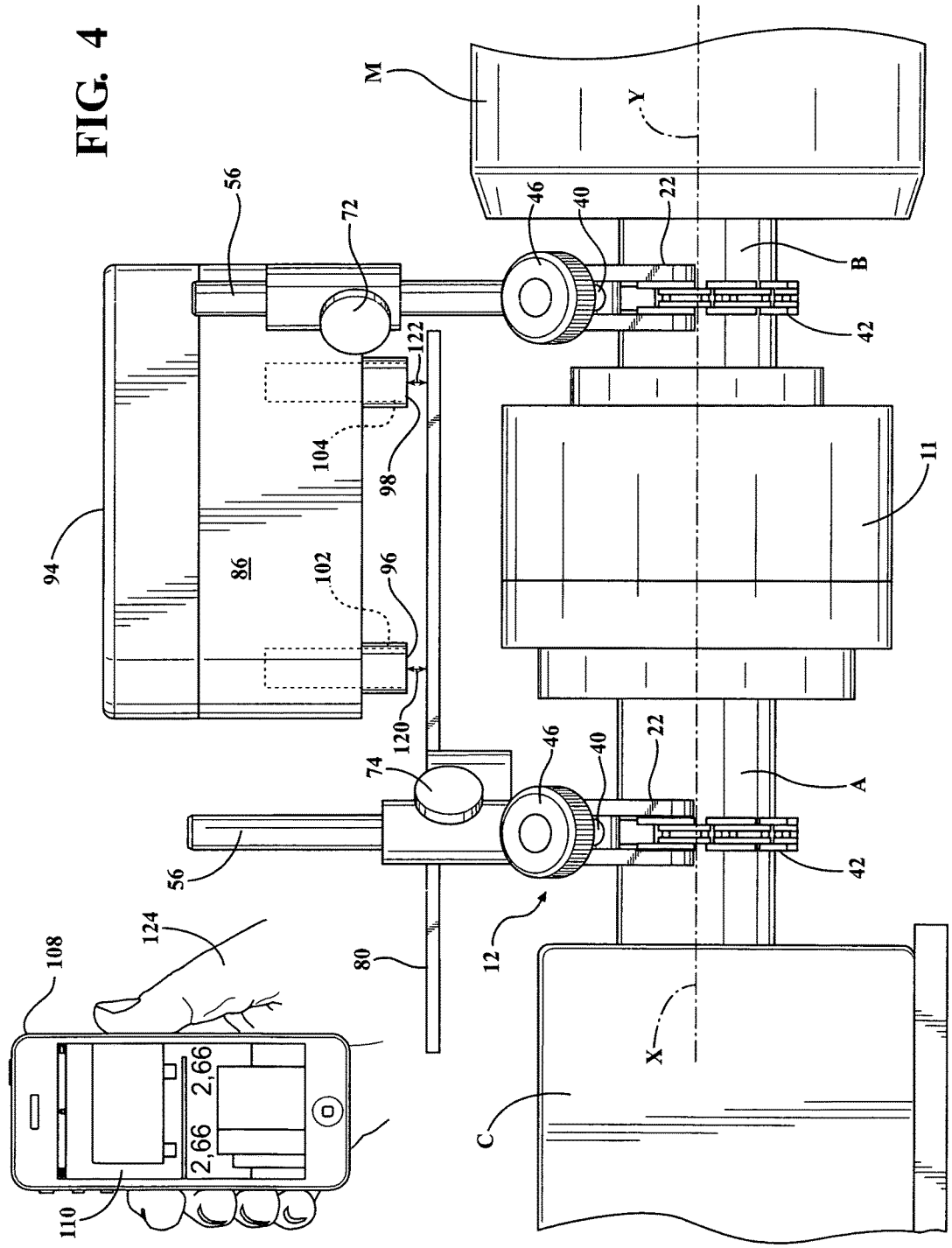
FIG. 4 illustrates another side view of the apparatus cooperably connected to a mobile device wherein the mobile device indicated on its screen that the shafts are perfectly aligned with the one another shaft.

Referring to the Figures, wherein like numerals indicate like or corresponding parts throughout the several views, an alignment apparatus (the tool) of the present invention is generally shown at 10 in FIGS. 1 through 5. FIGS. 2 through 4 illustrate the tool 10 mounted to a pair of shafts A and B connected by a coupling 11 having two parts, with one of the shafts A extending from a compressor C and the other shaft B extending from a motor M. The compressor C and the motor M are used for exemplary purposes and are not intended to limit the scope of the present invention. The tool 10 can be used on any other types of equipment that have rotatable shafts.

When perfectly aligned, such shafts A and B have their axes of rotation thereby coinciding along a straight line, generally indicated at L in FIG. 4. Contrary, any misalignment, as shown in FIG. 3, even minimal, can lead to vibration, excessive wear, and ultimate destruction of couplings, bearings, seals, gears and other components. Even flexible couplings that are designed to withstand minor misalignments cannot prevent negative effects on other machine components.

The assembly 10 has numerous applications including and not limited to aligning shafts, such as the shaft A and the shaft B, and any other elements wherein each shaft A and B defines its own axis X and Y and there is a need to align both shafts A and B before the same can be welded, fused or connected to form a unitary unit without limiting the scope of the present invention.

The tool 10 includes a pair of bracket devices (the brackets), i.e. a first bracket device and a second bracket device, generally shown at 12 and 14. The bracket devices 12 and 14 are cooperably mated with one another for rigidly holding shafts A and B. Each bracket device 12 and 14 includes a V-shaped element, generally indicated at 16, having a top side 18 and terminals ends 20 and 22 defined by sides 24 and 26 spaced from one another to form gaps. The sides 24 and 26 of the terminal end 22 further include ear portions 28 and 30 with openings 32 and 34 formed therein to receive a barrel 36 used as pivoting point. The barrel 36 defines an inlet 38 used to receive a pin 40 connected to and extending from a chain 42 thereby allowing the chain 42 and the pin 40 to pivot about the ear portions 28 and 30 as the shafts A and B are rigidly secured within the brackets 12 and 14. A tensioning knob 46 is connected to the pin 40 in order to tension the chain 42.

Alluding to the above, an anchor hook 50 is secured to the terminal end 20 in order to rigidly secure the chain 42 during tensioning of the chain in order to rigidly secure the shafts A and B within the respective bracket devices 12 and 14. The construction of the bracket devices 12 and 14 and the use of the chain 42 allows the tool 10 to secure the shafts A and B having different diameters. Those skilled in the art will appreciate that chains of other designs and types may be used with the tool 10 of the present invention without limiting the scope of the same.

Referring back to FIG. 1, the first bracket device 12 will be discussed herebelow in greater details. The first bracket device 12 includes a pair of rods 54 and 56 extending outwardly from the top side 18. The first bracket device 12 includes a bar bracket 58 for holding a magnet. The bar bracket 58 includes side towers 60 and 62 to receive the rods 54 and 56 to allow the bar bracket 58 to move between different position and relative to the first bracket device 12 about the rods 54 and 56. The bar bracket 58 defines a center part 64 presenting a central opening 66 and several inlets 68 and 70.

Alluding to the above, a magnet holder 71 is disposed into the opening 66 and several center pins 73 used as resting points for the bar are inserted into inlets 68 and 70. A pair of side knobs 72 and 74 is used to secure the side towers 60 and 62 to the respective rods 54 and 56 to prevent slidable movement of the bracket 58 relative the rods 54 and 56. An extension beam 80 slides and rests on the center part 64 of the bar bracket 58. Various materials and fabrication methods can be used to form all of the aforementioned elements of the first bracket device 12 without limiting the scope of the present invention.

Referring again to FIG. 1, the second bracket device 14 will be discussed in greater details. Similar to the bracket 12, the second bracket device 14 also includes the rods 54 and 56 extending outwardly from the top side 18. The second bracket device 14 includes a unit bracket holder, generally indicated at 82, for holding a housing unit 84. The unit bracket holder 82 includes the side knobs 72 and 74 to secure the unit bracket holder 82 to the respective rods 54 and 56 to prevent slidable movement of the unit bracket holder 82 relative the rods 54 and 56. The housing unit 84 includes an enclosure part 86 of the housing unit 84. The enclosure part 86 includes a battery 90 to provide power and an electrical circuit board and controller or central processing unit 92.

A lid part 94 is used to protect the battery 90 and the electrical circuit board 92 from any possible external impact and contaminants such as water, dust, and the like. A pair of sensor holders 96 and 98 extends from the bottom portion 100 of the enclosure part 86. The sensor holders 96 and 98 receive sensors or sensor probes 102 and 104 disposed therein and exposed to the extension beam 80. The sensors 102 and 104 for measuring the gap are non-contact sensors, preferably induction sensors. The sensors 102 and 104 are secured at fixed positions.

Each sensor element 102 and 104 includes a cable 106 electrically and operably connected to the electrical circuit board and the controller or central processing unit 92. The tool 10 moves between multiple angular positions, e.g. 12 o'clock, 3 o'clock, 6 o'clock, and 9 o'clock positions. The tool 10 is cooperably connected to a mobile device 108, such as, for example, IPhone, wherein the mobile device 108 indicates on its screen 110 the angular positions of the tool 10, shown at 112, 114, and 116 in FIG. 5. Those skilled in the art will appreciate that other devices can be used to provide a user 124 with information about the position of the tool 10 and distances between the sensor element 102 and 104 and the extension beam 80 without limiting the scope of the present invention.

Figure 5:
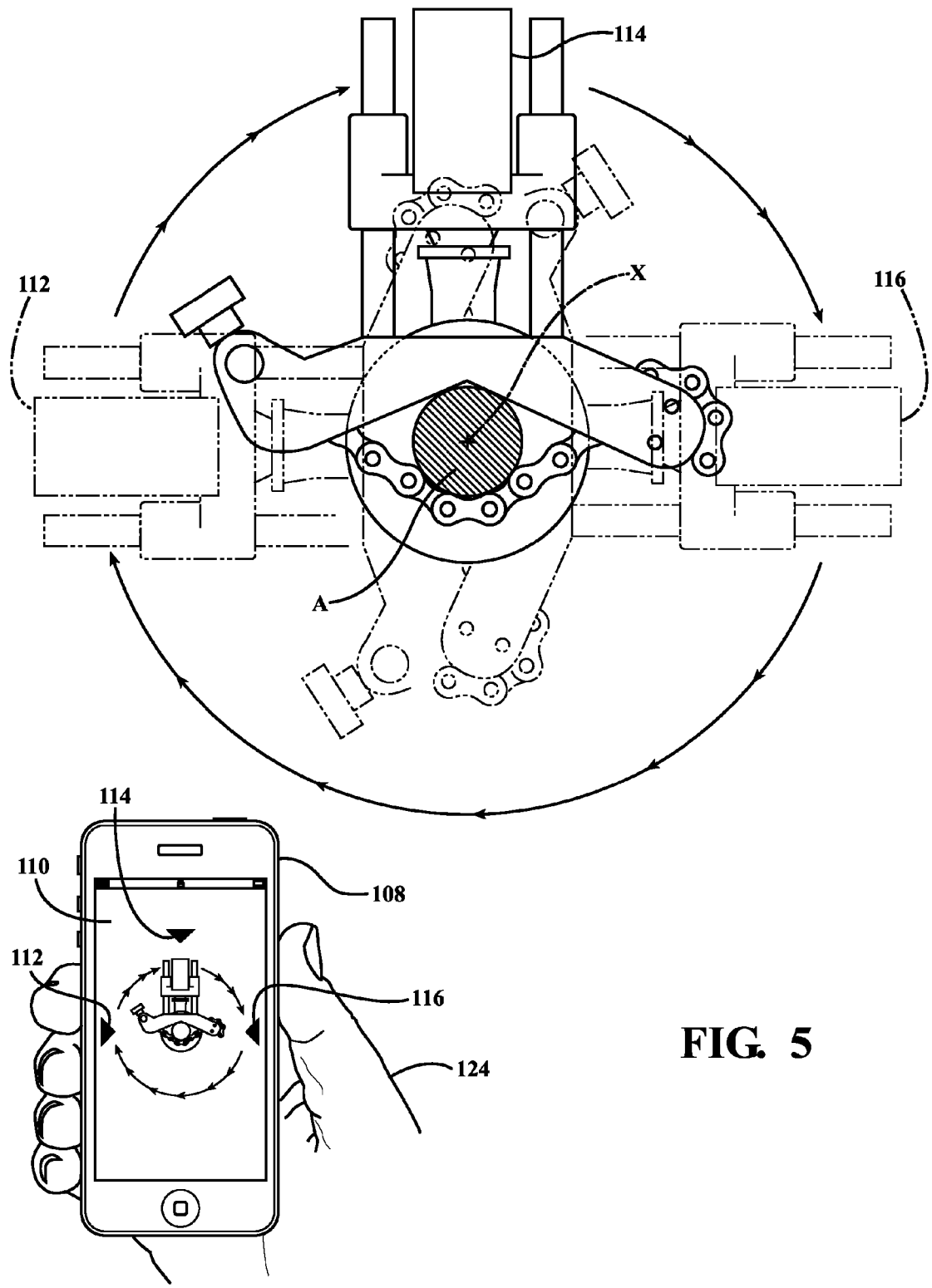
FIG. 5 illustrates a partially cross sectional view, illustrating rotational modes of the apparatus moving between multiple angular positions, e.g. 12 o'clock, 3 o'clock, 9 o'clock positions wherein the apparatus cooperably connected to the mobile device wherein the mobile device indicated on its screen the angular positions of the apparatus.

Referring now to FIGS. 3 through 5, application of the present invention will be discussed. As the shafts A and B are secured with the chains 42, the sensors 102 and 104 are exposed to the extension beam 80 thereby defining gaps or distances 120 and 122 between the extension beam 80 and the sensor probes 102 and 104. To perform shaft alignment on the machines, the tool 10 is mounted on both shafts A and B or sides of the coupling 11.

As best shown in FIG. 5, the measurement unit is turned on 106, and mobile application on the mobile device 108 is activated. After entering the machine information, the application guides the user 124 intuitively through the measurement using 3D animations and live-view. The two inductive proximity sensors 102 and 104 inside the instrument 86 measure the distance 120 and 122 to the reference bar 80. Just like the dial gauges method, misalignment causes these distances 120 and 122 to change, as shown on the screen 110, and allows the calculation of the misalignment using the application.

After determining the current shaft misalignment, the application guides the user 124 through the alignment process. Firstly, by showing what shims are needed for the vertical alignment and then which movements need to be performed for horizontal alignment.

As best shown in FIG. 3, the distance 120 differs from the distance 122 because the shaft A is misaligned relative the shaft B, i.e. the axis X of the shaft A is not aligned with the axis Y of the shaft B. A difference between the distances 120 and 122 is detected by the sensor probes 102 and 104, and a signal is sent through the cables 106 to the electrical circuit board and the controller or central processing unit 92, and then to the application. The difference detected at the depicted angular position of the tool is used to calculate the misalignment. Further measurements at different angular positions are also used in the calculation. The user 124 is informed about the misalignment between the two shafts A and B, as shown on the screen 110 of the mobile device in FIG. 3.

FIG. 4 shows both shafts A and B secured with the chains 42, with the sensor elements or sensor probes 102 and 104 exposed to the extension beam 80. The distance 120 is identical to the distance 122 because the shaft A is aligned relative the shaft B, i.e. the axis X of the shaft A is aligned with the axis Y of the shaft B. If no difference is detected between distances 120 and 122 at further angular positions, the sensor probes 102 and 104 send signal through the cables 106 to the electrical circuit board and the controller or central processing unit 92, and then to the application thereby informing the user 124 that no misalignment is present between the axis X and Y.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for measuring alignment of a first shaft defining a first axis and a second shaft defining a second axis with one of the shafts extending from a first equipment and the second shaft extending from a second equipment, said system comprising:
   a mobile device;
   a first bracket device for holding the first shaft and including a bar bracket movable relative said first bracket device, wherein said bar bracket includes a magnet holder for holding a magnet and an extension beam positioned in the center of said bar bracket and extending generally parallel to the first axis of the first shaft and the second axis of the second shaft;
   a second bracket device for holding the second shaft and including a housing unit movable relative said second bracket device and said first bracket device, said housing unit including a battery, an electrical circuit board, a controller; and at least a pair of non-contact sensors operably connected to said electrical circuit board and controller and exposed from said housing unit to said extension beam, wherein said sensors are spaced in axial direction from one another and radially spaced from said extension beam, wherein said sensors are configured to measure misalignment of the first shaft and the second shaft as said electrical circuit board and said controller determine distance between one of said sensors and said extension beam and distance between another of said sensors and said extension beam as said first bracket device and said second bracket device are rotated to at least two different angular positions around the first shaft and the second shaft; and
   wherein said electrical circuit board and controller are configured to transmit information about respective distances between said sensors and said extension beam to said mobile device.

2. The system as set forth in claim 1, wherein said first bracket device and said second bracket device include a V-shaped element having a top side and terminals ends defined by sides spaced from one another to form gaps.

3. The system as set forth in claim 1, wherein said sides of one of said terminal ends further include ear portions with openings formed therein to receive a barrel used as pivoting point and defining an inlet to receive a pin connected to and extending from a chain thereby allowing said chain and said pin to pivot about said ear portions as the first shaft and the second shaft are rigidly secured to said first bracket device and said second bracket device respectively.

4. The system as set forth in claim 3, wherein a tensioning knob is connected to said pin to tension said chains.

5. The system as set forth in claim 4, wherein an anchor hook is secured to each of said terminal ends of said chains to rigidly secure said chains during tensioning of said chains in order to rigidly secure the shafts within the respective first bracket device and said second bracket device.

6. The system as set forth in claim 5, wherein said first bracket device and said second bracket device include a pair of rods extending outwardly from said top side.

7. The system as set forth in claim 6, wherein said first bracket device further includes said bar bracket having side towers to receive said rods to allow said bar bracket to move between different position and relative to said first bracket device about said rods.

8. The system as set forth in claim 7, wherein said bar bracket further defines a center part to receive said extension beam.

9. The system as set forth in claim 7, wherein said housing unit of said second bracket is further defined by a unit bracket holder for holding said housing unit, an enclosure part, said battery to provide power to said electrical circuit board and said controller, and a lid part to protect said battery and said electrical circuit board from external impact and contaminants such as water and dust.

10. The system as set forth in claim 7, including a pair of external devices allowing to move said first bracket device and said second bracket device independently from one another.

11. The system as set forth in claim 7, wherein said electrical circuit board and said controller determine difference between a first position and a second position wherein in said first position as said electrical circuit board and said controller receive a first signal from said sensors exposed to said extension beam thereby defining identical gaps between said extension beam and said sensor to identify that the first shaft and the second shaft are aligned and said second position as said electrical circuit board and said controller receive a second signal from said sensors exposed to said extension beam thereby defining offset between said extension beam and said sensor to identify misalignment between the first shaft and the second shaft.

12. The system as set forth in claim 1, wherein said sensors are inductive proximity sensors.

13. The system as set forth in claim 1, wherein said first bracket device and said second bracket device are movable between multiple angular positions around the first shaft and the second shaft, e.g. 12 o'clock, 3 o'clock, 6 o'clock, and 9 o'clock positions, wherein said first bracket device and said second bracket device are cooperably connected to said mobile device as said mobile device indicates said angular positions of said first bracket device and said second bracket device relative the first shaft and the second shaft.

14. A method for measuring alignment of a first shaft defining a first axis and a second shaft defining a second axis with one of the shafts extending from a first equipment and the second shaft extending from a second equipment, said method comprising the steps of:
   engaging a first bracket about the first shaft, wherein said first bracket includes a bar bracket movable relative said first bracket, wherein said bar bracket includes a magnet holder for holding a magnet and an extension beam positioned in the center of said bar bracket and extending generally parallel to the first axis of the first shaft and the second shaft;

engaging a second bracket about the second shaft, wherein the second bracket includes a housing unit movable relative said second bracket and said first bracket, said housing unit including a battery, an electrical circuit board, a controller; and at least a pair of non-contact sensors operably connected to said electrical circuit board and controller and exposed from said housing unit to said extension beam, wherein said sensors are spaced in axial direction from one another and radially spaced from said extension beam, wherein said sensors are configured to measure misalignment of the first shaft and the second shaft as said electrical circuit board and said controller determine distance between one of said sensors and said extension beam and distance between another of said sensors and said extension beam; and rotating the first bracket and the second bracket device to at least two different radial positions around the first shaft and the second shaft thereby sending information about distances between the sensors and the extension beam to a mobile device.

15. The method as set forth in claim 14, wherein the step of forming the first bracket devise and the second bracket is further defined by providing a V-shaped element having a top side and terminals ends defined by sides spaced from one another to form gaps.

16. The method as set forth in claim 15, wherein the step of forming a V-shaped element is further defined by forming ear portions with openings formed therein to receive a barrel used as pivoting point and defining an inlet to receive a pin connected to and extending from a chain thereby allowing the chain and the pin to pivot about the ear portions as the first shaft and the second shaft are rigidly secured to the first bracket and the second bracket respectively.

17. The method as set forth in claim 14, wherein the step of forming the first bracket and the second bracket is further defined by connecting a pair of rods extending outwardly from the top side.

18. The method as set forth in claim 17, including the step of connecting said bar bracket having side towers to receive the rods to allow the bar bracket to move between different position and relative to the first bracket about the rods.

* * * * *